United States Patent [19]

Heitzer et al.

[11] 4,148,622

[45] Apr. 10, 1979

[54] PROCESS AND APPARATUS FOR THE PRODUCTION OF FLAT GLASS BY THE FLOAT GLASS METHOD

[75] Inventors: Xaver Heitzer, Cologne; Gunther Henseler, Hoffnungsthal; Hans Sustmann, Cologne, all of Fed. Rep. of Germany

[73] Assignee: Saint-Gobain Industries, Neuilly-sur-Seine, France

[21] Appl. No.: 772,952

[22] Filed: Feb. 28, 1977

[30] Foreign Application Priority Data

Feb. 27, 1976 [DE] Fed. Rep. of Germany ....... 2608052

[51] Int. Cl.² ............................................... C03B 18/02
[52] U.S. Cl. ................................... 65/99 A; 65/182 R
[58] Field of Search ................. 65/65 A, 99 A, 182 R

[56] References Cited

U.S. PATENT DOCUMENTS

| 3,323,890 | 6/1967 | Javaux ........................... 65/182 R X |
| 3,330,637 | 7/1967 | Loukes et al. ..................... 65/65 A X |
| 3,337,319 | 8/1967 | Edwards ......................... 65/65 A X |
| 3,467,512 | 9/1969 | Loukes et al. ....................... 65/99 A |
| 3,479,171 | 11/1969 | Robinson et al. ............... 65/65 A X |
| 3,625,668 | 12/1971 | Greenler ............................ 65/99 A |
| 3,771,985 | 11/1973 | Dickinson ........................... 65/99 A |
| 4,012,216 | 3/1977 | Marchand ........................... 65/99 A |

FOREIGN PATENT DOCUMENTS

| 1511817 | 12/1967 | France. |
| 2283097 | 8/1975 | France. |
| 4821323 | 12/1970 | Japan ..................................... 65/99 A |
| 1123222 | 8/1968 | United Kingdom. |

*Primary Examiner*—Arthur D. Kellogg
*Attorney, Agent, or Firm*—Pennie & Edmonds

[57] ABSTRACT

An improvement in the process for the production of a glass ribbon by the float glass method, wherein the glass ribbon is formed on a bath of molten metal, caused to float along on top of it and, after being sufficiently hardened, drawn off the bath. The improvement includes the step of pneumatically or mechanically generating and maintaining transverse and longitudinal currents in the molten metal in order to distribute the temperature evenly and/or to stretch the layer of glass on the metal bath. In construction, the currents are generated by a pump which is submerged in the molten metal. The pump includes pneumatic or mechanical structure for pumping molten metal through it so as to create the desired currents.

8 Claims, 7 Drawing Figures

PROCESS AND APPARATUS FOR THE PRODUCTION OF FLAT GLASS BY THE FLOAT GLASS METHOD

BACKGROUND OF THE INVENTION

By means of an already known process, transverse currents can be created in the metal bath by immersing coolers in it to create temperature gradients which then produce convection currents. The intensity of these convection currents is determined by the magnitude of the temperature gradient. Since the temperature gradient is in principle undesirable and can only be produced by means for continuous cooling, only relatively weak currents can be produced and maintained by this process.

By means of another known process, transverse currents can be produced in the metal bath by linear induction motors positioned near the side walls of, and immediately above, the metal bath. A disadvantage of this process is that it is very expensive to maintain electrical induction motors in working condition at approximately 1,000° C.

In the float method of producing flat glass, it is also conventional to use mechanically operating pumps in order to draw off the impurities that form on the surface of the metal bath. These pumps however are installed in a stationary manner outside of the actual tank and are connected to the bath through special pipes and/or bays. They are not used to create currents in the bath.

SUMMARY OF THE PRESENT INVENTION

The present invention provides an effective process that can be carried out with simple means and at minimal expense and by which the desired currents in the bath can be regulated within a wide range in both direction and strength. A particular advantage of the new process is that, on the one hand, the temperature of the metal bath is not disadvantageously affected and, on the other hand, the desired currents are produced by relatively simple means.

The process embodied in the present invention consists of mechanically or pneumatically producing the currents within the metal bath. For doing this, pumps are introduced into the tank from outside and placed in the desired location between the glass ribbon and the side wall of the tank. In construction, each pump includes a pump housing made of a material compatible with the molten metal. One or more inlets are provided on one side of the housing for drawing the metal in and one or more outlets on another side, preferably on the side lying opposite the inlets, for releasing the metal. A supporting device extending out of the float bath tank is connected to the pump housing. The pump can therefore be lowered into the metal bath and its position varied.

DETAILED DESCRIPTION OF THE PREFERRED EMBODIMENTS

Figure 1:
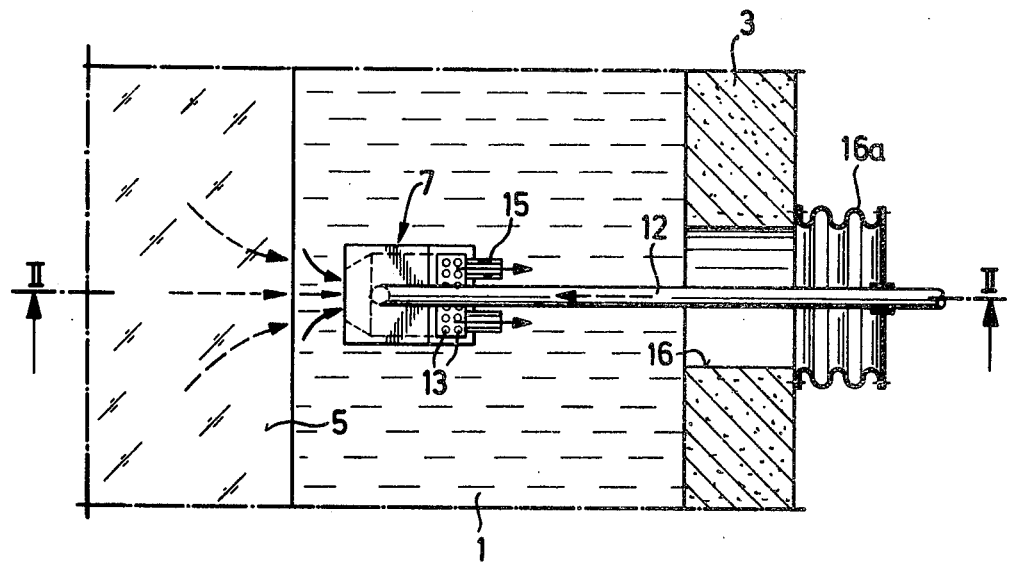
FIG. 1 is a horizontal sectional view along line I—I of FIG. 2 through a float glass apparatus constructed according to the invention.
Figure 2:
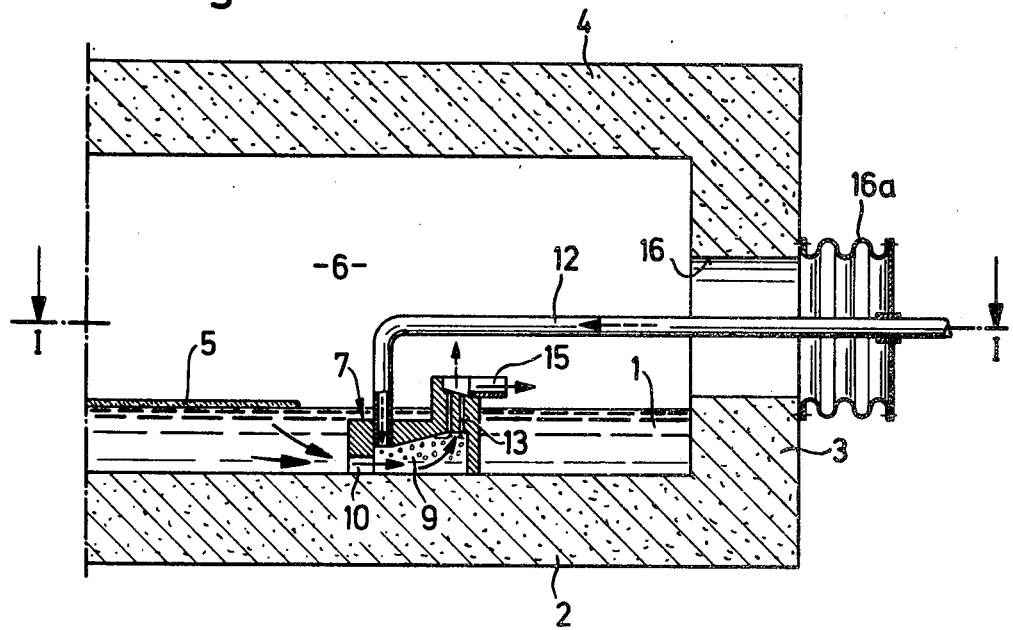
FIG. 2 is a vertical cross-sectional view along line II—II of FIG. 1.

The float glass installation in accordance with FIGS. 1 and 2 comprises a tank for a bath 1 of molten metal. Only the righthand portion of this tank is shown in the drawing. The tank has a bottom 2, side walls 3, and a cover 4. The glass ribbon 5 floats on bath 1. In space 6 above bath 1 and glass ribbon 5 there is a controlled atmosphere which prevents oxidation of the metal and/or gives rise to a slight reducing effect and produces a superatmospheric pressure inside the tank. A plurality of pumps 7, only one of which is shown in FIGS. 1 and 2, are installed in the space between glass ribbon 5 and side walls 3. The materials customarily used for devices that operate in a bath of molten metal such as, for example, graphite, are suitable for making the pump housing and other parts.

Figure 3:
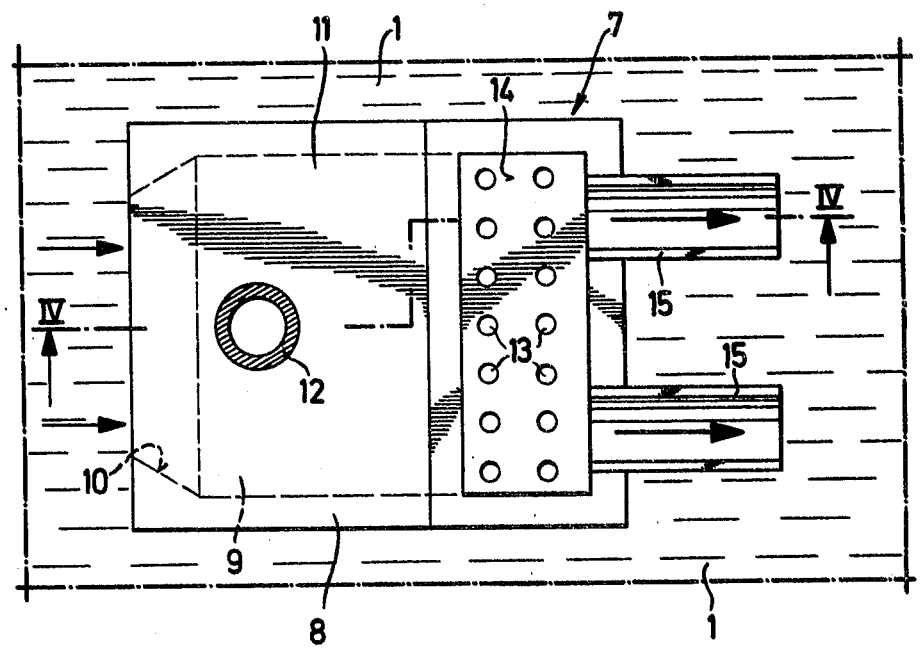
FIG. 3 is an enlarged plan view along line III—III of FIG. 4 of a pneumatically operating pump.
Figure 4:
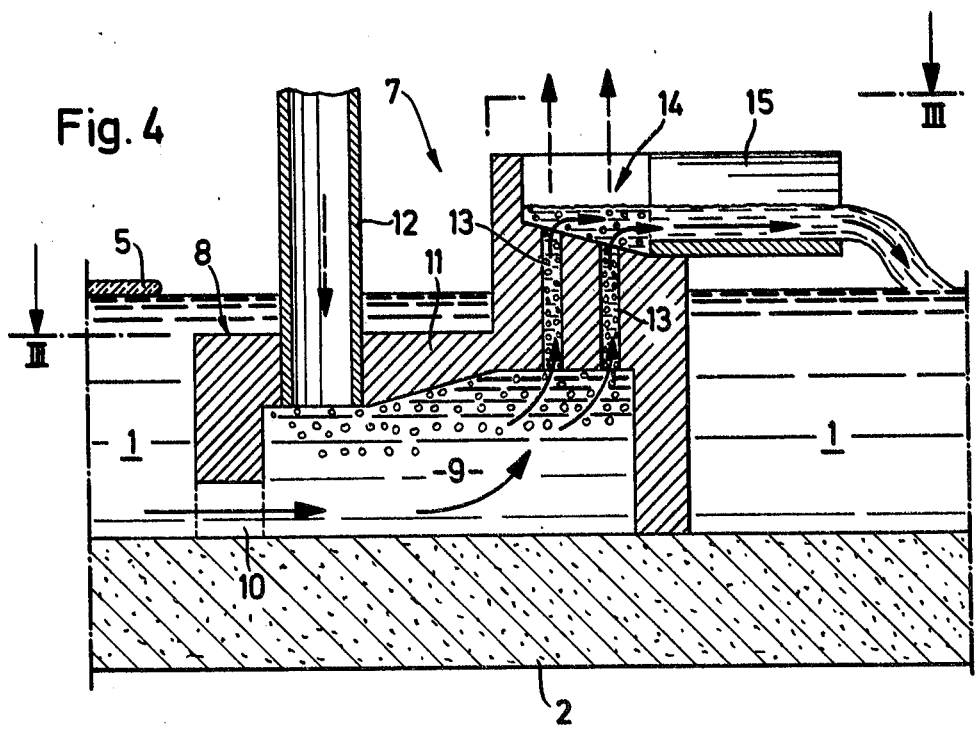
FIG. 4 is a vertical cross-sectional view along line IV—IV of FIG. 3.

Pump 7, shown in FIGS. 1 and 2, is a pneumatic pump which works on the gas lift principle and is driven by the gases comprising the controlled atmosphere that fills space 6 above the glass ribbon and metal bath. The operation of this pump is shown in FIGS. 3 and 4. The pump consists of a housing 8 which rests on the bottom of the bath tank. This housing encloses a space 9 into which the liquified metal can penetrate through inlet 10. Near inlet 10, a pipe 12 introduces the pressurized gas comprising the controlled atmosphere through covering 11 into space 9. This gas escapes through openings 13 into space 6 above the glass ribbon and metal bath and carries the liquified metal along with it. The metal is raised into a collecting tank 14 and flows from it over the half-pipe gutters 15 back into the metal bath.

Gas supply 12 is designed to serve at the same time as a fixture for supporting the pump housing. It extends out of the bath tank through an opening 16 in its side wall 3. Opening 16 is large enough to allow introduction and withdrawal of the pump into and out of the bath. Opening 16 is sealed off around supply pipe 12 by means of a bellows type seal 16a. The direction of the transverse current in bath 1 can be changed by rotating pump 7 around the vertical axis of supply pipe 12. The conveying capacity of pump 7 which depends on the amount of gas going through openings 13 can easily be varied by changing the amount of gas supplied. By altering the height of intake 10 when required, the liquified metal can be drawn in from any desired level of the bath.

Figure 5:
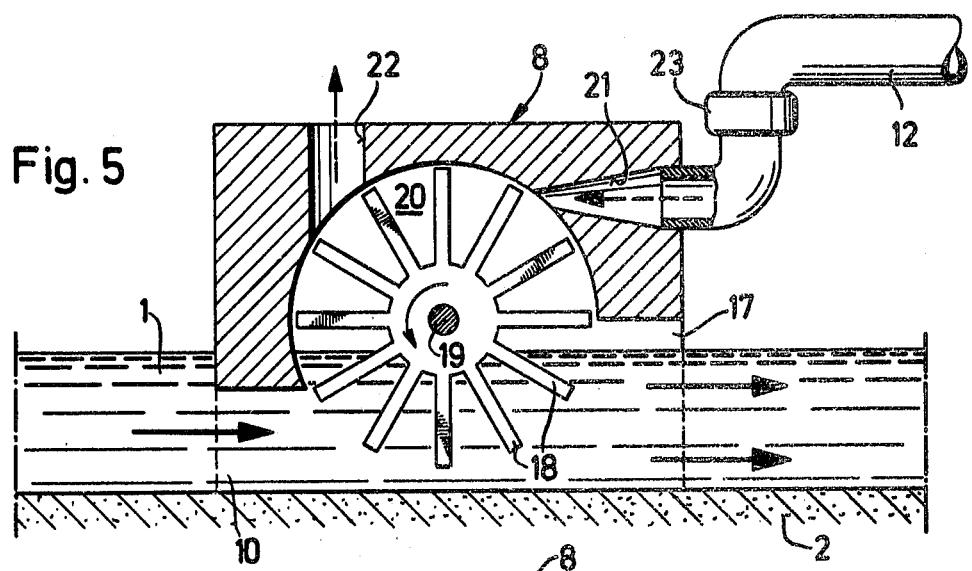
FIG. 5 is a vertical sectional view through a vane pump with pneumatic drive.

FIG. 5 shows a vane type pump designed for the generation of currents in the metal bath which is driven by the gas comprising the controlled atmosphere in the bath tank. The pump is contained in a housing 8 that rests on the bottom of the tank. Housing 8 has an inlet 10 and an outlet 17 for the liquified metal 1. Vane wheel 18 rotates freely on a shaft 19 securely fixed into the side walls of a cylindrical space 20. The vane wheel is driven by forcing compressed gas from the controlled atmosphere through pipe 12 and nozzle 21 onto the vanes of the wheel whereby it is made to revolve. The gas exits through opening 22 into space 6. The other end of gas pipe 12 extends back out of the tank through opening 16 in its side wall.

In order to change the direction of the transverse current in the bath 1, the pump can easily be rotated into the desired position at a threaded joint 23. The conveying capacity of this pump can also be varied by changing the amount of gas supplied through pipe 12.

Figure 6:
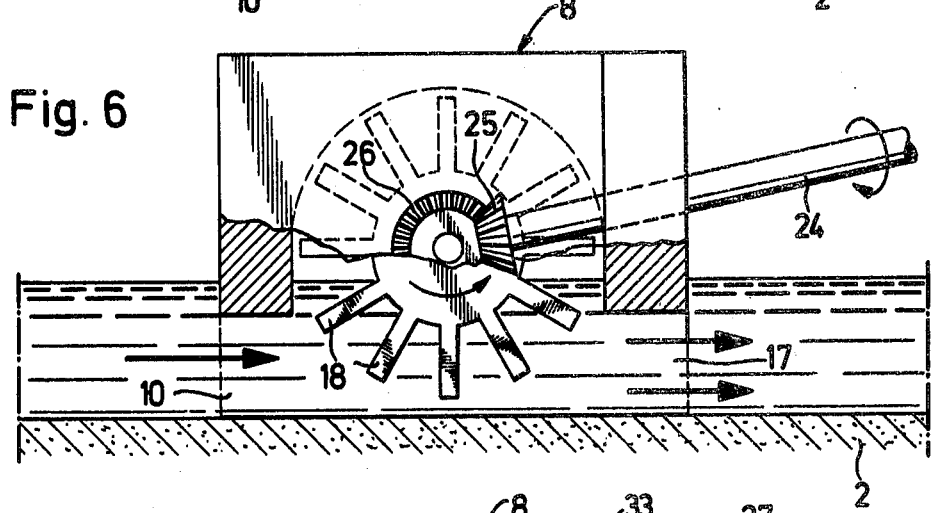
FIG. 6 is a partial sectional view of a mechanically driven vane pump.

FIG. 6 shows a vane type pump designed for the generation of a transverse current in metal bath 1. The conveying capacity of this pump is the same as that of the vane pump shown in FIG. 5. However, this pump is driven by a shaft 24 that drives vane wheel 18 by means of a bevel gear drive 25, 26. Shaft 24 extends out of the bath tank through an opening in one of the latter's side wall and is driven by a motor installed outside of the shallow tank. The direction of the suction opening as well as the conveying capacity can be varied in ways similar to those used for the vane pump in FIG. 5.

Figure 7:
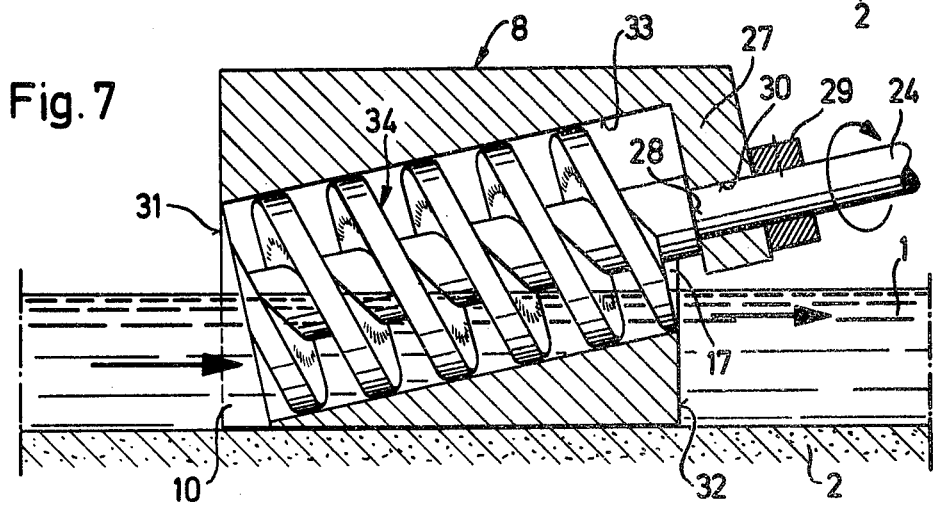
FIG. 7 is a vertical sectional view through a mechanically driven screw pump.

FIG. 7 shows a screw type pump for generating a transverse current in metal bath 1. Inside housing 8, a helix screw 34 is mounted inside a cylindrical borehole. A drive shaft 24 is connected to screw 34. Shaft 24 goes through shoulder 28, set collar 29, and borehole 30 in wall 27 which forms part of the housing. The screw is driven by shaft 24 in a manner similar to the vane wheel 18 of the vane pump in FIG. 6. Since the front and rear walls, 31 and 32 respectively, of the housing are open, the liquified metal has unimpeded access to the helix screw; and as a result of the screw's revolution, flows without hindrance through the pump housing and back into metal bath 1. The capacity of this pump can be varied by changing the speed of revolution of the screw, and the direction of its suction and discharge can be varied by rotating the pump as a whole.

We claim:

1. In the process for the production of a glass ribbon by the float glass method wherein the glass ribbon is formed on a bath of molten metal contained within a tank, floated along on top of the bath, and after being sufficiently hardened, drawn off the bath, and in which transverse and longitudinal currents are generated and maintained in the bath, the improvement comprising the step of:
   (a) pneumatically pumping a predetermined capacity of molten metal from a location submerged in said bath between the glass ribbon and the side walls of the tank to generate said currents, the pneumatic pumping being effected by:
      (1) pumping gas downwardly into the bath at one point,
      (2) directing the gas through a portion of the bath in the direction of the desired current,
      (3) pumping the gas along with molten metal upwardly to a level above the normal level of the bath, and
      (4) returning the removed molten metal to the bath.

2. In the process according to claim 1, the inprovement further comprising:
   (a) adjusting the direction of flow of gas through the molten metal to vary the direction of flow of the current produced thereby.

3. In an apparatus for the production of glass ribbon by the float glass method wherein the glass ribbon is formed on a bath of molten metal contained within a tank, floated along on top of the bath and, after being sufficiently hardened, drawn off the bath and in which means are provided for generating and maintaining transverse and longitudinal currents in the bath, the improvement wherein:
   (a) said means includes pneumatically operating gas lift pumps submerged in said bath between the glass ribbon and the side walls of the tank for raising the liquid to an outlet above the level of the bath, each of said pumps including:
      (1) a pumping housing made of material compatible with the metal,
      (2) one or more inlets for the metal on one side of the housing submerged in said bath,
      (3) one or more outlets for the molten metal on the other side of the housing, said outlets including the outlet above the level of the bath to which the liquid is raised, and
      (4) support means extending out of the float bath tank for adjustably supporting the pumping housing in adjustable positions in the metal bath.

4. In an apparatus according to claim 3, the improvement wherein the pump includes:
   (a) a pipe connected to said pump housing for pumping compressed gas downwardly into the bath at a location adjacent to said inlets;
   (b) an enclosed space within said housing connected at one end to said inlets and at its other end to said outlets, said outlets extending upwardly to a level above the normal level of the bath; and
   (c) means for directing the molten metal passing through said outlets back to said bath.

5. In an apparatus according to claim 4, the improvement wherein:
   (a) said pipe extends upwardly from said pump housing along a vertical axis and out through the side wall of the tank; and
   (b) said pump housing is connected to said pipe for rotation about said vertical axis.

6. In an apparatus for the production of glass ribbon by the float glass method wherein the glass ribbon is formed on a bath of molten metal contained within a tank, floated along on top of the bath and, after being sufficiently hardened, drawn off the bath and in which means are provided for generating and maintaining transverse and longitudinal currents in the bath, the improvement wherein:
   (a) said means includes fluid pumping devices submerged in said bath between the glass ribbon and the side walls of the tank, each of said devices comprising:
      (1) a pump housing made of a material compatible with the molten metal,
      (2) a blade wheel disposed within said housing with the lower half of the blade immersed in the molten metal bath,
      (3) one or more inlets for the molten metal on one side of the housing,
      (4) one or more outlets for the molten metal on another side of the housing,
      (5) said inlets and outlets being located at a submerged level in the bath and at about the same depth of the bottommost section of the blade wheel, and
      (6) a nozzle positioned in the upper part of the pump housing in alignment with the upper half of the blade wheel to direct gases against the blades disposed above the level of the bath to rotate the blade wheel.

7. In an apparatus for the production of glass ribbon by the float glass method wherein the glass ribbon is formed on a bath of molten metal contained within a tank, floated along on top of the bath and, after being sufficiently hardened, drawn off the bath and in which means are provided for generating and maintaining transverse and longitudinal currents in the bath, the improvement wherein:

(a) said means for generating and maintaining the transverse currents includes fluid pumping devices submerged in said bath between the glass ribbon and each of the side walls of the tank and at a plurality of locations spaced longitudinally along said bath, each of said pumping devices comprising:
(b 1) a pump housing made of a material compatible with the molten metal,
(2) one or more inlets for the molten metal on one side of the housing facing the central longitudinal axis of the bath,
(3) one or more outlets for the molten metal on another side of the housing facing the adjacent side wall of the tank, and
(4) pumping means for pumping molten metal through said housing at a variable rate from the inlets to the outlets thereof to generate the transverse currents in the bath and flow of molten metal at each of said locations from the center of the bath underlying the glass ribbon toward the side walls of the tank and mixing thereof with the normal cold return flow along said side walls.

8. In an apparatus for the production of glass ribbon by the float glass method wherein the glass ribbon is formed on a bath of molten metal contained within a tank, floated along on top of the bath and, after being sufficiently hardened, drawn off the bath and in which means are provided for generating and maintaining transverse and longitudinal currents in the bath, the improvement wherein:

(a) said means for generating and maintaining the transverse currents includes fluid pumping devices submerged in said bath at adjustable positions between the glass ribbon and each of the side walls of the tank and at a plurality of locations spaced longitudinally along said bath, each of said pumping devices comprising:
(1) a pump housing made of a material compatible with the molten metal,
(2) one or more inlets for the molten metal on one side of the housing facing the central longitudinal axis of the bath,
(3) one or more outlets for the molten metal on another side of the housing facing the adjacent side wall of the tank,
(4) pumping means for pumping molten metal through said housing at a variable rate from the inlets to the outlets thereof to generate the transverse currents in the bath and flow of molten metal at each of said locations from the center of the bath underlying the glass ribbon toward the side walls of the tank and mixing thereof with the normal cold return flow along said side walls,
(5) support means extending out of the float bath tank for adjustably supporting said pump housing at different lateral and angular positions in the metal bath, and
(6) means for supplying operating energy from a location external of said bath to said pumping devices submerged in said bath to drive the devices.

* * * * *